(12) United States Patent
Ehlert

(10) Patent No.: US 11,586,035 B2
(45) Date of Patent: Feb. 21, 2023

(54) LASER PROJECTION DEVICE HAVING STARTING POINT OF REFLECTOR SHIFTED

(71) Applicant: Robert Bosch GmbH, Stuttgart (DE)

(72) Inventor: Alexander Ehlert, Reutlingen (DE)

(73) Assignee: Robert Bosch GmbH, Stuttgart (DE)

(*) Notice: Subject to any disclaimer, the term of this patent is extended or adjusted under 35 U.S.C. 154(b) by 279 days.

(21) Appl. No.: 16/762,661

(22) PCT Filed: Sep. 27, 2018

(86) PCT No.: PCT/EP2018/076372
§ 371 (c)(1),
(2) Date: May 8, 2020

(87) PCT Pub. No.: WO2019/101403
PCT Pub. Date: May 31, 2019

(65) Prior Publication Data
US 2020/0278534 A1    Sep. 3, 2020

(30) Foreign Application Priority Data

Nov. 22, 2017 (DE) .......................... 102017220825.2

(51) Int. Cl.
*G02B 26/10* (2006.01)
*G09G 3/00* (2006.01)
(Continued)

(52) U.S. Cl.
CPC ....... *G02B 26/101* (2013.01); *G02B 26/0816* (2013.01); *G02B 26/0833* (2013.01);
(Continued)

(58) Field of Classification Search
CPC ............ G02B 26/0816; G02B 26/0833; G02B 26/101; G02B 26/105; G02B 27/0149;
(Continued)

(56) References Cited

U.S. PATENT DOCUMENTS

| 2004/0119004 A1* | 6/2004 | Wine | G02B 27/0149 |
| | | | 250/234 |
| 2011/0141441 A1* | 6/2011 | Konno | G02B 26/101 |
| | | | 353/69 |

(Continued)

FOREIGN PATENT DOCUMENTS

| EP | 2960708 A1 | 12/2015 |
| WO | 2014128864 A1 | 8/2014 |

OTHER PUBLICATIONS

International Search Report for PCT/EP2018/076372, dated Dec. 13, 2018.

*Primary Examiner* — Richard J Hong
(74) *Attorney, Agent, or Firm* — Norton Rose Fulbright US LLP; Gerard Messina

(57) ABSTRACT

A laser projection device includes at least one first reflector element, which is linearly movable. A period of the at least one first reflector element corresponds to a period of time for reproducing a single. The laser projection device includes at least one second reflector element, which is movable in a sinusoidal manner, a semiperiod of a sine corresponding to one line. The at least one first reflector element and the at least one second reflector element are movable about two axes at least substantially perpendicular to each other. The laser projection device includes at least one control and/or regulating unit, which is configured to control and/or regulate the at least one first reflector element.

9 Claims, 3 Drawing Sheets

(51) Int. Cl.
 *G09G 3/02* (2006.01)
 *G02B 26/08* (2006.01)
(52) U.S. Cl.
 CPC .............. *G09G 3/007* (2013.01); *G09G 3/025* (2013.01); *G09G 2320/0233* (2013.01)
(58) Field of Classification Search
 CPC ........... G09G 2320/0233; G09G 3/007; G09G 3/025; H04N 9/3135; H04N 5/2628
 See application file for complete search history.

(56) References Cited

U.S. PATENT DOCUMENTS

| | | |
|---|---|---|
| 2013/0201459 A1 | 8/2013 | Seo et al. |
| 2013/0235266 A1 | 9/2013 | Tang et al. |
| 2014/0092316 A1 | 4/2014 | Rumreich |
| 2014/0098302 A1* | 4/2014 | Rumreich ............ H04N 5/2628 353/31 |
| 2017/0154558 A1* | 6/2017 | Atsuumi ............. G02B 26/101 |

\* cited by examiner

LASER PROJECTION DEVICE HAVING STARTING POINT OF REFLECTOR SHIFTED

BACKGROUND INFORMATION

A conventional laser projection device may have at least one first reflector element, which is linearly movable, a period of the at least one first reflector element corresponding to a period of time for reproducing a single image; and at least one second reflector element, which is movable in a sinusoidal manner, a semiperiod of a sine corresponding to one line. The at least one first reflector element and the at least one second reflector element are movable about two axes at least substantially perpendicular to each other.

SUMMARY

In accordance with the present invention, a laser projection device is provided having at least one first reflector element, which is linearly movable, a period of the at least one first reflector element corresponding to a period of time for reproducing a single image; and having at least one second reflector element, which is movable in a sinusoidal manner, a semiperiod of a sine corresponding to one line; the at least one first reflector element and the at least one second reflector element being movable about two axes at least substantially perpendicular to each other.

In accordance with the present invention, is provided that the laser projection device includes at least one control and/or regulating unit, which is configured to control and/or regulate the at least one first reflector element in such a manner, that in at least two consecutive, single images, a starting point of a movement of the at least one first reflector element is shifted.

A "reflector element" is to be understood as, in particular, a reflective element for electromagnetic radiation, in particular, electromagnetic radiation visible to a human eye, and/or for infrared radiation. In particular, the first and second reflector elements are reflective in a range of an electromagnetic spectrum, in which the laser projection device emits electromagnetic radiation. The first and the second reflector elements are preferably made at least partially of a material that reflects electromagnetic radiation. In particular, the first and the second reflector elements may be made at least partially of gold, silver, silicon or another material that reflects electromagnetic radiation and appears useful to one skilled in the art. Alternatively, or in addition, it is possible for the first and/or the second reflector element to have a coating, which reflects electromagnetic radiation, on an upper surface of the first and the second reflector elements. It may be preferable for the coating to be made at least partially of gold, silver, silicon or another material, which reflects electromagnetic radiation and appears useful to one skilled in the art. For a particularly high reflectance, the first and the second reflector elements may preferably have, in addition, a polished, particularly preferably, a mirror-finished, upper surface. The first reflector element preferably takes the form of a vertical mirror, which is set up in the laser projection device to deflect at least one laser beam onto different points of the second reflector element that are offset vertically with respect to each other. The first reflector element is preferably supported so as to be movable about a first axis. The second reflector element preferably takes the form of a horizontal mirror, which is set up in the laser projection device to project horizontal lines of at least one single image. The second reflector element is preferably supported so as to be movable about a second axis. It is preferable for the first and the second reflector elements to be able to be formed in one piece and, in particular, to be able to form, together, a 2-D mirror. The 2-D mirror may preferably be configured to deflect the laser beam in a horizontal and in a vertical direction.

A "vertical" direction is to be understood as, in particular, a direction, which extends at least substantially parallelly to the second axis of the second reflector element. In this case, "substantially parallelly" is to be understood as, in particular, an orientation of a direction relative to a reference direction, in particular, in a plane; the direction deviating from the reference direction by, in particular, less than 8°, advantageously, less than 5°, and particularly advantageously, less than 2°. A "horizontal" direction is to be understood as, in particular, a direction, which extends at least substantially perpendicularly to the vertical direction. Here, the expression "substantially perpendicularly" shall define, in particular, an orientation of a direction relative to a reference direction; in particular, viewed in a plane, the direction and the reference direction forming an angle of 90°, and the angle having a maximum deviation of, in particular, less than 8°, advantageously, less than 5°, and particularly advantageously, less than 2°.

The first and the second reflector elements are preferably configured to deflect at least one laser beam. In particular, "configured" is to be understood as specially programmed, designed and/or equipped. That an object is configured for a particular function, is to be understood to mean, in particular, that the object fulfills and/or executes this particular function in at least one application state and/or operating state. Through deflection of the laser beam, at least one single image may preferably be projected onto a projection surface. The laser beam is preferably generated by a radiation source of the laser projection device. The radiation source may take the form of, in particular, a solid-state laser, a gas laser, a molecular laser or another source of laser radiation appearing useful to one skilled in the art. It is particularly preferable for the radiation source to take the form of a laser diode. In particular, the laser projection device may include a plurality of laser diodes. The laser projection device preferably includes a laser diode emitting in a red spectral range, a laser diode emitting in a green spectral range, and a laser diode emitting in a blue spectral range. Alternatively, or in addition, it is possible for the laser projection device to include an infrared laser diode.

The radiation source preferably transmits the laser beam onto the first reflector element. The first reflector element preferably deflects the laser beam onto the second reflector element. The second reflector element preferably deflects the laser beam onto the projection surface. The first and the second reflector elements preferably move, in order to generate at least one single image on the projection surface. The second reflector element preferably moves in an oscillatory manner, in particular, sinusoidally, and at a higher speed than the first reflector element. The second reflector element preferably moves at a frequency greater than 1 kHz. Through movement of the second reflector element, the laser beam is preferably moved horizontally across the projection surface and generates lines of a single image. In particular, a semiperiod of a sine corresponds to one line. The first reflector element preferably moves in a manner similar to a saw tooth or triangle, in particular, linearly in sections, more slowly than the second reflector element, and about a first axis perpendicular to the second axis of the second reflector element. The first reflector element preferably moves at a frequency less than or equal to 100 Hz. Preferably, lines on the projection surface, which are offset vertically from each other, are generated by moving the first reflector element. In particular, a period of the first reflector element corresponds to a period of time for reproducing a single image. The starting point of a linear section of the movement of the first reflector element preferably designates a vertical starting point of a single image, and an end point of the linear section of the movement of the first reflector element preferably designates a vertical end point of the single image. The single image is preferably constructed from the vertical starting point to the vertical end point. In the case of a standard orientation of the laser projection device, construction of the single image from the vertical starting point to the vertical end point preferably corresponds to construction of the single image from an upper edge of the single image to a lower edge of the single image. Alternatively, it is possible for the single image to be constructed from the vertical end point to the vertical starting point.

The first reflector element preferably moves continuously. The first reflector element moves, in particular, during the construction of a line by the second reflector element. It is preferable for a line to have, in particular, a vertically decreasing path from a start of the line to an end of the line. The starting point of the line and the end point of the line are, in particular, vertically offset from each other, in particular, in proportion to a distance the first reflector element has traveled during the construction of the line. In particular, regions not illuminated by the laser beam are formed in the region of the starting points and the end points of the lines. In particular, regions not illuminated by the laser beam are formed between consecutive pairs of lines.

The control and/or regulating unit is preferably configured to control and/or regulate the first reflector element in such a manner, that in consecutive, single images, the starting point of the movement of the first reflector element is shifted. To control and/or regulate the first reflector element, the control and/or regulating unit is preferably connected to the first reflector element, in particular, electrically connected. A "control and/or regulating unit" is to be understood as, in particular, a unit having at least one piece of control electronics. "Control electronics" are to be understood as, in particular, a unit including a processor unit and a storage unit, as well as an operating program stored in the storage unit. In particular, the control and/or regulating unit is configured to control and/or regulate the first reflector element in such a manner, that in consecutive, single images, the starting point of the movement of the first reflector element is displaced to an arbitrary point on a movement trajectory of the first reflector element, preferably, to a point appearing useful to one skilled in the art. It is particularly preferable for the control and/or regulating unit to be configured, in particular, to control and/or regulate the first reflector element in such a manner, that in a second, single image, the starting point of the movement of the first reflector element is offset from the starting point of the movement of the first reflector element in a first, single image immediately preceding, in particular, the second, single image, such that in the second, single image, a region on the projection surface not illuminated in the first, single image is illuminated by the laser beam.

The example embodiment of the laser projection device according to the present invention advantageously allows the projection surface to be illuminated uniformly. In particular, by vertically shifting the lines of consecutive, single images with respect to each other, unilluminated regions on the projection surface may be minimized. A uniform display of brightness of image material may be advantageously achieved.

In addition, in accordance with an example embodiment of the present invention, it is provided that the at least one control and/or regulating unit is configured to control and/or regulate the at least one reflector element in such a manner, that in at least two consecutive, single images, the starting point of the movement of the at least one first reflector element is shifted by at least half the width of a line. That "in at least two consecutive, single images, the starting point of the movement of the at least one first reflector element is shifted by at least half the width of a line," is to be understood to mean, in particular, that in at least two consecutive, single images, the starting point of the movement of the first reflector element is shifted in such a manner, that on the projection surface, in at least two consecutive, single images, a laser spot of the laser beam is shifted vertically by at least half of a line width. A line width preferably corresponds to a vertical extension of a line. The laser spot of the laser beam preferably takes the form of a point of intersection of the laser beam with the projection surface. A shift in the starting point of the movement of the first reflector element by at least half of a line width in at least two consecutive, single images preferably constitutes shifting of the laser spot of the laser beam into an unilluminated region in at least two consecutive, single images. Illumination of the projection surface, which is visibly more uniform than in the case of no shifting, is preferably achieved in at least two consecutive, single images. In at least two consecutive, single images, it is preferable for the starting point of the movement of the first reflector element to be shifted by a maximum of one and a half line widths. In the case of shifting the starting point of the movement of the first reflector element by exactly one half of a line width in at least two consecutive, single images, in particular, in four consecutive, single images, the laser spot of the laser beam is moved into different positions. More uniform illumination of the projection surface may advantageously be achieved than in the case of shifting the starting point of the movement of the first reflector element by more than one half of a line width in at least two consecutive, single images. In particular, in the case of a high frame rate of the laser projection device, in particular, at a frame rate greater than 24 single images per second, it may be useful to shift the starting point of the movement of the first reflector element by exactly one half of a line width in at least two consecutive, single images. At such a high frame rate, more uniform illumination of the projection surface may advantageously be achieved than in the case of shifting the starting point of the movement of the first reflector element by more than one half of a line width in at least two consecutive, single images, while the visual impression of a viewer remains undisturbed.

In addition, it is provided that the at least one control and/or regulating unit be configured to control and/or regulate the at least one first reflector element in such a manner, that in at least two consecutive, single images, the starting point of the movement of the at least one first reflector element is shifted by exactly one line width. That "in at least two consecutive, single images, the starting point of the movement of the at least one first reflector element is shifted by exactly one line width," is to be understood to mean, in particular, that in at least two consecutive, single images, the starting point of the movement of the first reflector element is shifted in such a manner, that on the projection surface, in at least two consecutive, single images, the laser spot of the laser beam is shifted vertically by exactly one line width. A shift in the starting point of the movement of the first reflector element by exactly one line width in at least two consecutive, single images preferably constitutes shifting of the laser spot into a center of an unilluminated region in at least two consecutive, single images. In particular, in the case of a low frame rate of the laser projection device, in particular, in the case of a frame rate of less than or equal to 24 single images per second, it may be useful to shift the starting point of the movement of the first reflector element by exactly one line width in at least two consecutive, single images. In particular, in the case of such a low frame rate, an advantageous relationship of uniform illumination of the projection surface with an undisturbed visual impression of a viewer may be achieved.

In addition, in accordance with an example embodiment of the present invention, it is provided that the at least one control and/or regulating unit be configured to control and/or regulate the at least one second reflector element in such a manner, that in consecutive, single images, the starting point of the movement of the at least one second reflector element is shifted by exactly one line length. That "in consecutive, single images, the starting point of the movement of the at least one second reflector element is shifted by exactly one line length," is to be understood to mean, in particular, that in consecutive, single images, the starting point of the movement of the second reflector element is shifted in such a manner, that on the projection surface, the laser spot of the laser beam is shifted horizontally by exactly one line length in consecutive, single images. A line length preferably corresponds to a horizontal extension of a line. To control and/or regulate the second reflector element, the control and/or regulating unit is preferably connected to the second reflector element, in particular, electrically. The control and/or regulating unit is preferably configured to control and/or regulate the second reflector element in such a manner, that if, in a single image, the starting point of the movement of the second reflector element was a first reversal point of the second reflector element on a first side of the second axis of the second reflector element, then, in a following single image, the starting point of the movement of the second reflector element is shifted to a second reversal point of the second reflector element, on a second side of the second axis of the second reflector element opposite to the first side of the second axis of the second reflector element. In particular, in consecutive, single images, the laser spot is moved across the projection surface in opposite directions. In this manner, a uniformity of the illumination of the projection surface may be advantageously improved.

In addition, in accordance with an example embodiment of the present invention, it is provided that the at least one control and/or regulating unit be configured to control and/or regulate image reconstruction synchronously to a movement of the at least one first reflector element and the at least one second reflector element, in particular, as a function of a shift in the starting point of the movement of the at least one reflector element in at least two consecutive, single images. In particular, the control and/or regulating unit is configured to adapt pixel values supplied to the radiation source in such a manner, that in spite of the shift in the starting point of the movement of the first reflector element, the consecutive, single images are represented correctly on the projection surface. To adapt the image reconstruction, the control and/or regulating unit is connected to the radiation source, in particular, electrically. In a first single image, a starting point of the movement of the reflector elements may advantageously be defined by the starting point of the movement of the first reflector element, and by the starting point of the movement of the second reflector element at a first reversal point of the second reflector element, on a first side of the second axis of the second reflector element. To construct a first line of the first single image, the second reflector element preferably moves from the first reversal point of the second reflector element, on the first side of the second axis of the second reflector element, to a second reversal point of the second reflector element, on a second side of the second axis of the second reflector element. In a second, single image that, in particular, immediately follows the first single image, the starting point of the movement of the first reflector element is preferably raised by a line width in comparison with the starting point of the movement of the first reflector element in the first, single image. In particular, in the second, single image, the starting point of the movement of the reflector elements may be defined by the starting point of the movement of the first reflector element in the first, single image, raised by a line width, and by the starting point of the movement of the second reflector element at the first reversal point of the second reflector element on the first side of the second axis of the second reflector element. In particular, for at least substantially coincident projection of the first and the second, single images, the control and/or regulating unit is preferably configured to start the image reconstruction after the first reflector element has moved by one line width. To construct a first line of the second single image, the second reflector element preferably moves from the second reversal point of the second reflector element on the second side of the second axis of the second reflector element, to the first reversal point of the second reflector element on the first side of the second axis of the second reflector element. In particular, to construct each line of the second, single image, in each instance, the second reflector element moves in a direction opposite to a direction for constructing each line of the first, single image. In particular, for an at least substantially coincident projection of the first and the second, single images, the control and/or regulating unit is preferably configured to control and/or regulate the image reconstruction in such a manner, that along each line of the second, single image, image contents are reconstructed in an opposite order in comparison with each corresponding line of the first, single image.

If, as an alternative to, or in addition to, the starting point of the movement of the first reflector element, the starting point of the movement of the second reflector element is shifted in consecutive, single images, then the control and/or regulating unit may preferably be configured to control and/or to regulate the image reconstruction as a function of the shift in the starting point of the movement of the first reflector element, and/or as a function of the shift in the starting point of the movement of the second reflector element. Uniform illumination of the projection surface with simultaneously correct image reproduction of the laser projection device may be attained in an advantageous manner.

In addition, it is provided that the at least one control and/or regulating unit be configured to increment a vertical y-coordinate of each pixel in a single image by a value $o_{frame}$ corresponding to the shift in the starting point of the movement of the at least one first reflector element. A computational program, with the aid of which the processor unit of the control and/or regulating unit may compute a new y-coordinate for each pixel in the single image, by incrementing the original y-coordinate of each pixel in the single image by the value $o_{frame}$, may advantageously be stored in the storage unit of the control and/or regulating unit. The control and/or regulating unit is preferably configured to supply the recalculated image values of the single images to the radiation source for projection of the single images. It is advantageous that efficient adaptation of the image reconstruction may be achieved.

In addition, it is provided that the at least one control and/or regulating unit be configured to ascertain the y-coordinate of an nth pixel, $y_n$, as follows:

$$y_n = \sum_{n_i} \Delta y + \text{int}\left(\frac{n}{n_y}\right) \cdot o_{line} + (m-1) \cdot o_{frame},$$

$$\text{where } n_i = n - \text{int}\left(\frac{n}{n_y}\right) \cdot n_y,$$

where n is a number of a pixel inside of a single image, $n_l$ is a number of a pixel within a line, $\Delta y$ corresponds to an increment of a vertical position of a pixel for a time interval, in which the pixel is projected, as a result of a continuous movement of the first reflector element, $n_y$ is a number of pixels in one line, $o_{line}$ is a vertical offset at an end of a line in a single image, m is a number of a single image, where m=1 ... $m_i$, $m_i$ is an interleaving factor, and $o_{frame}$ is a vertical offset of at least two trajectories of the laser beam between at least two consecutive, single images. A "vertical offset" is to be understood as, in particular, a distance of two points from each other in the vertical direction. In this connection, it is to be understood as, in particular, the vertical spacing of two illuminated regions. The interleaving factor preferably takes the form of a number of consecutive, single images having different trajectories of the laser beam. In the case of a shift in the starting point of the movement of the first reflector element by exactly one line width, the interleaving factor preferably has the value $m_i$=2. A "trajectory of the laser beam" is to be understood as, in particular, a path of the laser spot generated by the laser beam, on the projection surface, for projection of an image. The computational program stored in the storage unit of the control and/or regulating unit preferably includes an above-mentioned function for calculating the y-coordinate of the nth pixel, $y_n$. To ascertain the y-coordinate of the nth pixel, $y_n$, it is preferable for the processor unit of the control and/or regulating unit to be able to access the function stored in the storage unit for calculating the y-coordinate of the nth pixel, $y_n$. The y-coordinate of an nth pixel, $y_n$, may be advantageously ascertained in an efficient manner.

In addition, in accordance with an example embodiment of the present invention, it is provided that the at least one control and/or regulating unit be configured to control and/or regulate a degree of overlap of the lines of at least two consecutive, single images, using a vertical offset of at least two trajectories of the laser beam between the at least two consecutive, single images. The vertical offset of at least two trajectories of the laser beam between the at least two consecutive, single images preferably corresponds to the vertical offset of at least two trajectories of the laser beam between at least two consecutive, single images $o_{frame}$. A "degree of overlap of the lines of at least two consecutive, single images" is to be understood as, in particular, a measure of the illumination of the projection surface due to the projection of at least two consecutive, single images. Preferably, the greater the degree of overlap is, the more uniform the illumination of the projection surface is. Preferably, the smaller the vertical offset of the at least two trajectories of the laser beam between the at least two consecutive, single images is, the greater the degree of overlap is. Preferably, the control and/or regulating unit may adjust the vertical offset of the at least two trajectories of the laser beam between the at least two consecutive, single images. In particular, to calculate the y-coordinate of the nth pixel, $y_n$, the control and/or regulating unit may use an arbitrary value, preferably, a value appearing useful to one skilled in the art, for the vertical offset of the at least two trajectories of the laser beam between the at least two consecutive, single images. It is advantageous for the degree of overlap of the lines of at least two consecutive, single images to be able to be adjusted flexibly.

In addition, in accordance with an example embodiment of the present invention, an example is provided for operating a laser projection device according to the present invention; the laser projection device including at least one first reflector element, which is linearly movable, at least in sections, a period of the at least one first reflector element corresponding to a period of time for reproducing a single image; and including at least one second reflector element, which is movable in a sinusoidal manner, a semiperiod of a sine corresponding to one line; the at least one first reflector element and the at least one second reflector element being movable about two axes at least substantially perpendicular to each other.

In particular, in at least one method step, it is provided that at least one first reflector element be controlled and/or regulated in such a manner, that in at least two consecutive, single images, a starting point of a movement of the at least one first reflector element is shifted. Unilluminated regions on a projection surface may be minimized in an advantageous manner. A uniform display of brightness of image material may be advantageously achieved.

In addition, it is provided that, in particular, in at least one method step, image reconstruction be controlled and/or regulated synchronously to a movement of the at least one first reflector element and the at least one second reflector element, in particular, as a function of a shift in the starting point of the movement of the at least one first reflector element in at least two consecutive, single images. Uniform illumination of the projection surface with simultaneously correct image reproduction of the laser projection device may be attained in an advantageous manner.

Furthermore, the present invention is directed to a laser projector having at least one laser projection device according to the present invention. In accordance with an example embodiment of the present invention, the laser projection device includes at least one first reflector element, which is linearly movable, at least in sections, a period of the at least one first reflector element corresponding to a period of time for reproducing an individual image; and includes at least one second reflector element, which is movable in a sinusoidal manner, a semiperiod of a sine corresponding to one line; the at least one first reflector element and the at least one second reflector element being movable about two axes at least substantially perpendicular to each other. The laser projector preferably takes the form of a scanning laser projector, in particular, for generating an image line-by-line. The laser projector preferably includes even more components necessary for operating the laser projector. In particular, the laser projector may include at least one power supply, at least one data input, at least one image processor, at least one housing, as well as further components appearing useful to one skilled in the art. It is advantageous for a laser projector to be able to be provided, which is able to illuminate a projection surface uniformly.

In this connection, the laser projection device of the present invention, the method of the present invention and/or the laser projector of the present invention shall not be limited to the use and specific embodiment described above. In particular, in order to achieve a functionality described here, the laser projection device of the present invention, the method of the present invention and/or the laser projector of the present invention may have a number of individual elements, component parts and units, as well as method steps, different from a number mentioned here. In addition, in the ranges of values indicated in this description, values lying within the above-mentioned limits are also to be acknowledged as described and as applicable as desired.

BRIEF DESCRIPTION OF THE DRAWINGS

Further advantages of the present invention are derived from the description of the figures below. An exemplary embodiment of the present invention is shown in the figures. The figures and the description herein include numerous features in combination. One skilled in the art will necessarily consider the features individually, as well, and unite them to form useful, further combinations.

DETAILED DESCRIPTION OF EXAMPLE EMBODIMENTS

Figure 1:
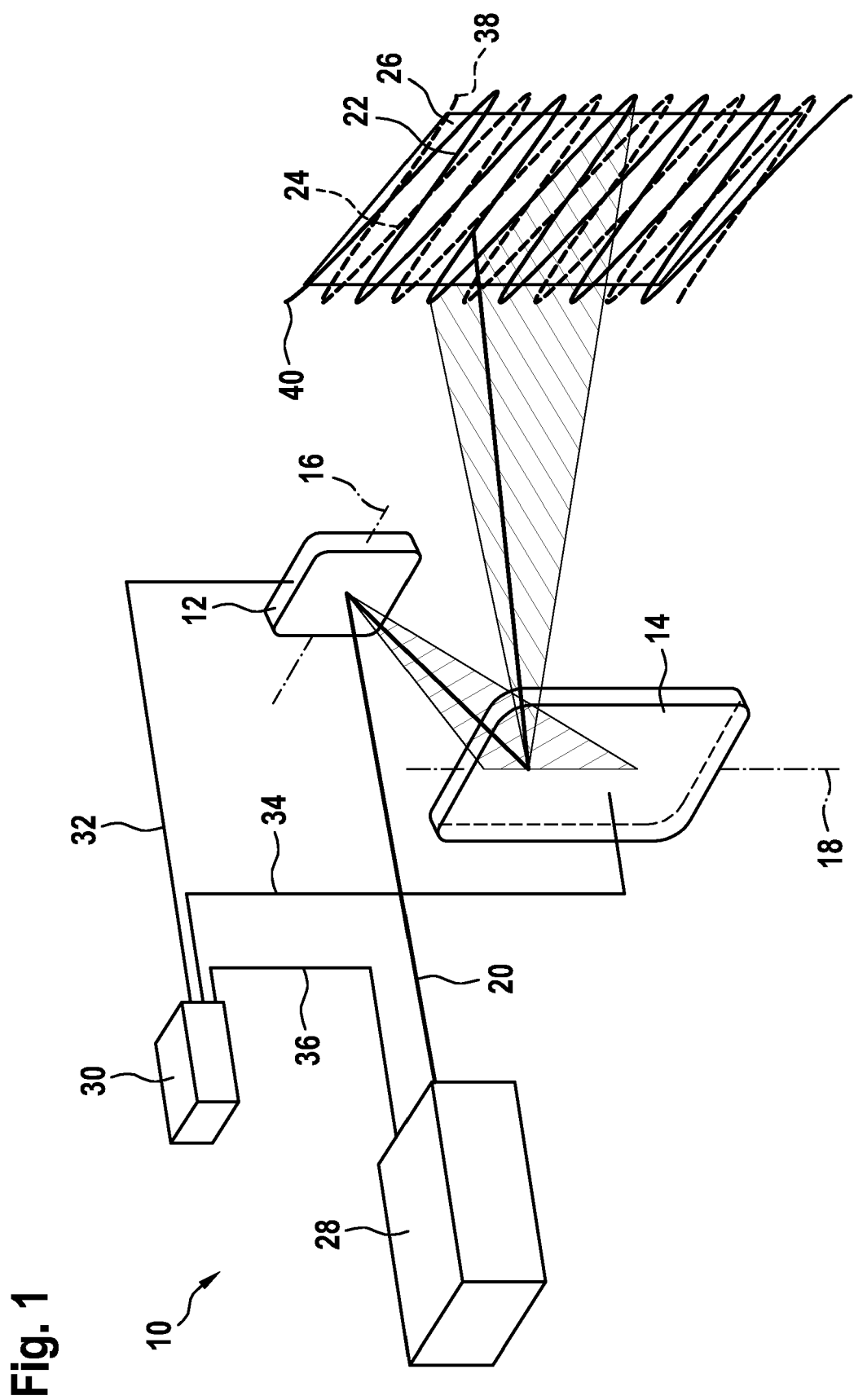
FIG. 1 shows a schematic representation of an example laser projection device according to the present invention.

FIG. 1 shows a schematic representation of an example laser projection device 10 according to the present invention. Laser projection device 10 includes a first reflector element 12 and a second reflector element 14. First reflector element 12 takes the form of a vertical mirror and is supported so as to be movable about a first axis 16. Second reflector element 14 takes the form of a horizontal mirror and is supported so as to be movable about a second axis 18. First axis 16 and second axis 18 are oriented perpendicularly to each other.

First reflector element 12 is configured to deflect a laser beam 20 in a vertical direction. Second reflector element 14 is configured to deflect the laser beam 20 deflected by first reflector element 12, in a horizontal direction. In order to clearly represent the functionality of second reflector element 14, second reflector element 14 is depicted semitransparently. Using the laser beam 20 deflected by the two reflector elements 12, 14, laser projection device 10 projects a first single image 22 and a second single image 24 onto a projection surface 26. Laser beam 20 is generated by a radiation source 28. Radiation source 28 takes the form of a laser diode.

On their upper surfaces, the two reflector elements 12, 14 each include a coating that reflects electromagnetic radiation. The reflective coating is made of gold. Alternatively, the reflective coating may also be made of silver, silicon, or another material, which reflects electromagnetic radiation and appears useful to one skilled in the art. The upper surfaces of the two reflector elements 12, 14 are each mirror-finished for a high reflectance.

Laser projection device 10 includes a control and/or regulating unit 30. Control and/or regulating unit 30 is configured to control and/or regulate first reflector element 12, second reflector element 14 and radiation source 28. Control and/or regulating unit 30 is connected via a first electrical line 32 to first reflector element 12 in an electrically conductive manner. Control and/or regulating unit 30 is connected via a second electrical line 34 to second reflector element 14 in an electrically conductive manner. Control and/or regulating unit 30 is connected via a third electrical line 36 to radiation source 28 in an electrically conductive manner.

Control and/or regulating unit 30 is configured to control and/or regulate first reflector element 12 in such a manner, that in at least two consecutive, single images 22, 24, a starting point of a movement of first reflector element 12 is shifted. Two consecutive, single images 22, 24 are indicated on projection surface 26 in light of, in each instance, a path of a laser spot of laser beam 20 on projection surface 26. Control and/or regulating unit 30 is configured to control and/or regulate first reflector element 12 in such a manner, that in at least two consecutive, single images 22, 24, the starting point of the movement of first reflector element 12 is shifted by at least one half of a line width. In the present exemplary embodiment, second single image 24 is shifted vertically by exactly one line width in comparison with first single image 22. Control and/or regulating unit 30 controls and/or regulates first reflector element 12 in such a manner, that in consecutive, single images 22, 24, the starting point of the movement of first reflector element 12 in the second single image is raised vertically by exactly one line width relative to the starting point of the movement of first reflector element 12 in the first single image. A second image starting point 38 of second single image 24 is shifted by exactly one line length with respect to a first image starting point 40 of first single image 22. Alternatively, or in addition, it is possible for control and/or regulating unit 30 to control and/or regulate second reflector element 14 in such a manner, that in consecutive, single images 22, 24, second image starting point 38 of second single image 24 is shifted by exactly one line length with respect to first image starting point 40 of first single image 22.

Control and/or regulating unit 30 is configured to control and/or regulate an image reconstruction synchronously to a movement of first reflector element 12 and second reflector element 14, in particular, as a function of the shift in the starting point of the movement of first reflector element 12. To control and/or regulate the image reconstruction, control and/or regulating unit 30 is connected via electrical line 36 to radiation source 28 in an electrically conductive manner. Control and/or regulating unit 30 controls and/or regulates radiation source 28 in such a manner, that in spite of the shift in the starting point of the movement of first reflector element 12, single images 22, 24 are reconstructed correctly and coincidently on projection surface 26. Control and/or regulating unit 30 may control and/or regulate radiation source 28 in such a manner, that in spite of a shift in the starting point of the movement of second reflector element 14, single images 22, 24 are reconstructed coincidentally and correctly on projection surface 26.

Control and/or regulating unit 30 is configured to increment a vertical y-coordinate of each pixel in single images 22, 24 by a value $o_{frame}$ corresponding to the shift in the starting point of the movement of first reflector element 12. In the present exemplary embodiment, the starting point of the movement of first reflector element 12 in second single image 24 is shifted by exactly one line width in comparison with the starting point of the movement of first reflector element 12 in first single image 22.

The following function for ascertaining the y-coordinate of an nth pixel, $y_n$, is stored in a storage unit of control and/or regulating unit 30 not shown in further detail:

$$y_n = \sum_{n_i} \Delta y + \text{int}\left(\frac{n}{n_y}\right) \cdot o_{line} + (m-1) \cdot o_{frame},$$

$$\text{where } n_i = n - \text{int}\left(\frac{n}{n_y}\right) \cdot n_y,$$

where n is a number of a pixel inside of a single image 22, 24, $n_l$ is a number of a pixel within a line, $\Delta y$ corresponds to an increment of a vertical position of a pixel for a time interval, in which the pixel is projected, as a result of a continuous movement of first reflector element 12, $n_y$ is a number of pixels in one line, $o_{line}$ is a vertical offset at an end of a line in a single image 22, 24, m is a number of a single image 22, 24, where m=1 ... $m_i$, $m_i$ is an interleaving factor, and $o_{frame}$ is a vertical offset 42 of at least two trajectories 48, 50 of laser beam 20 between at least two consecutive, single images 22, 24. In the present exemplary embodiment, with a shift in the starting point of the movement of first reflector element 12 by exactly one line width, the interleaving factor has a value $m_i$=2. Control and/or regulating unit 30 is configured to calculate the y-coordinate of nth pixel, $y_n$, with the aid of the above-mentioned function. To calculate the y-coordinate of nth pixel, $y_n$, control and/or regulating unit 30 includes a processor unit not shown in further detail.

Control and/or regulating unit 30 is configured to control and/or regulate a degree of overlap of the two consecutive, single images 22, 24, using a vertical offset 42 of two trajectories 48, 50 of laser beam 20, between the two consecutive, single images 22, 24. Vertical offset 42 takes the form of a vertical distance between two illuminated regions 44, 46 (cf. FIG. 2). The smaller the control and/or regulating unit 30 sets the vertical offset 42 of the two trajectories of laser beam 20 between the two consecutive, single images 22, 24, the larger the degree of overlap is.

An example method for operating laser projection device 10 is described in the following. In at least one method step, first reflector element 12 is controlled and/or regulated in such a manner, that in the consecutive, single images 22, 24, the starting point of the movement of first reflector element 12 is shifted. In at least one further method step, the image reconstruction is controlled and/or regulated synchronously to the movement of first reflector element 12 and second reflector element 14, in particular, as a function of the shift in the starting point of the movement of first reflector element 12 in at least two consecutive, single images 22, 24. Regarding further method steps of the method for operating laser projection device 10, reference may be made to the above description of laser projection device 10, since this description is to be read analogously on the method, as well, and therefore, all of the features regarding laser projection device 10 are also acknowledged as described with regard to the method for operating laser projection device 10.

Figure 2:
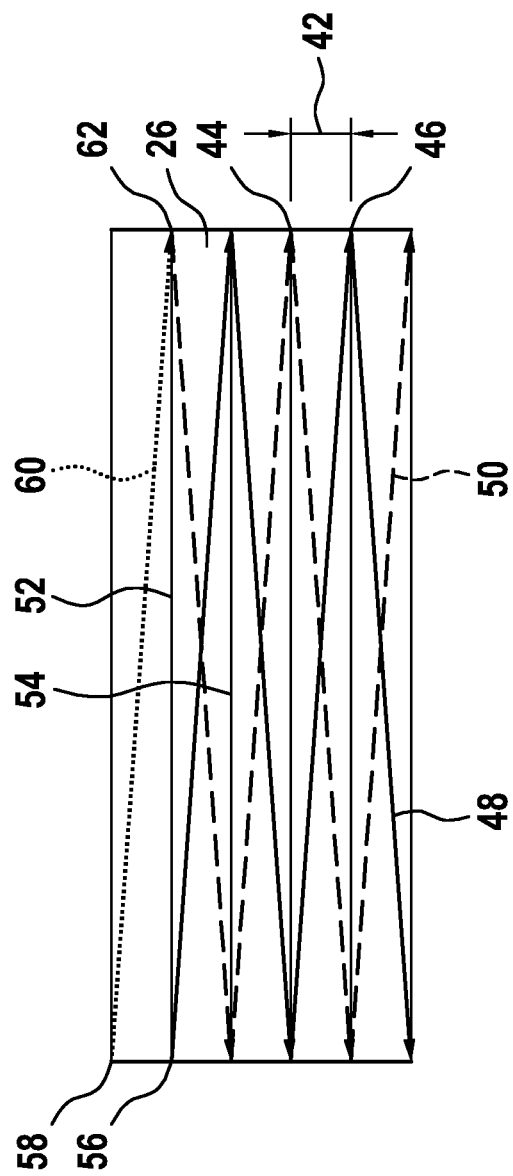
FIG. 2 shows a schematic representation of trajectories of a laser spot on a projection surface.

FIG. 2 shows trajectories 48, 50 of laser beam 20. First trajectory 48 corresponds to a projection of first single image 22 onto projection surface 26. Second trajectory 50 corresponds to the projection of second single image 24 onto projection surface 26. Projection surface 26 is shown as a grid. The vertical spacing of a first horizontal line 52 and a second horizontal line 54 of projection surface 26 corresponds to a line width. The ends of lines and movement directions of the laser spot of laser beam 20 on projection surface 26 are each designated by an arrow. A first trajectory starting point 56 of first trajectory 48 and a second trajectory starting point 58 of second trajectory 50 are spaced apart from each other vertically by exactly one line width. Second trajectory starting point 58 is vertically raised by exactly one line width relative to the first trajectory starting point. For correct and coincident projection of second single image 24 relative to first single image 22, the control and/or regulating unit controls and/or regulates the image reconstruction in such a manner, that an image reconstruction starts at a third trajectory starting point 62. On trajectory section 60, radiation source 28 remains switched off, and projection surface 26 remains unilluminated. Equally uniform illumination of projection surface 26 may be attained, if, in consecutive, single images 22, 24, the starting point of the movement of second reflector element 14 is shifted by exactly one line length. Third trajectory starting point 62 of second trajectory 50 is shifted horizontally by exactly one line length with respect to first trajectory starting point 56 of first trajectory 48, but not shifted vertically. By shifting the movement of second reflector element 14 in second single image 24 to third trajectory starting point 62, second trajectory 50 is obtained in exactly the same manner as by shifting the movement of first reflector element 12 in second single image 24 to second trajectory starting point 58.

A first illuminated region 44 and a second illuminated region 46 are also shown in FIG. 2. The vertical distance between the two illuminated regions 44, 46 corresponds to the vertical offset 42 of the two trajectories 48, 50 of laser beam 20 between the two consecutive, single images 22, 24. The smaller the vertical offset 42 of the two trajectories 48, 50 of laser beam 20 between the two consecutive, single images 22, 24 is, the larger the degree of overlap of trajectories 48, 50 of laser beam 20 is.

Figure 3:
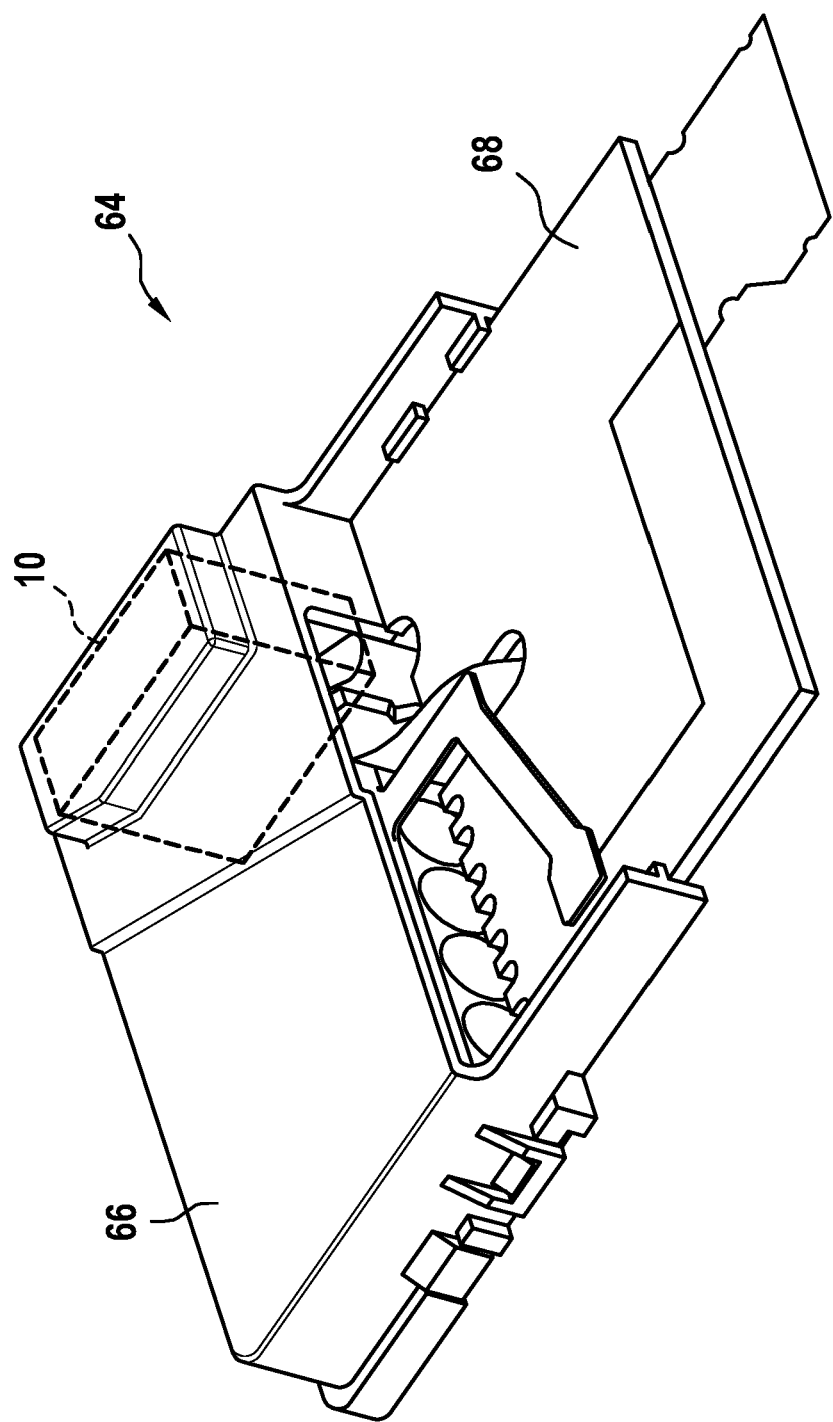
FIG. 3 shows a perspective view of an example laser projector according to the present invention.

FIG. 3 shows a perspective view of an example laser projector 64 according to the present invention. Laser projector 64 includes laser projection device 10. Laser projection device 10 is situated inside of a housing 66 of laser projector 64 and is indicated by a region marked in outline by a dashed line. Laser projection device 10 is situated on a main board 68 of laser projector 64.

What is claimed is:

1. A laser projection device, comprising:
   at least one first reflector element which is linearly movable, at least in sections, a period of the at least one first reflector element corresponding to a period of time for reproducing a single image;
   at least one second reflector element which is movable in a sinusoidal manner, the at least one first reflector element and the at least one second reflector element being movable about two axes which are at least substantially perpendicular to each other; and
   at least one control and/or regulating unit configured to control and/or regulate the at least one first reflector element in such a manner, that in at least two consecutive, single images, a starting point of a movement of the at least one first reflector element is shifted,
   wherein the at least one control and/or regulating unit is configured to increment a vertical y-coordinate of each pixel in a single image by a value corresponding to the shift in the starting point of the movement of the at least one first reflector element.

2. The laser projection device as recited in claim 1, wherein the at least one control and/or regulating unit is configured to control and/or regulate the at least one first reflector element in such a manner, that in at least two consecutive, single images, the starting point of the movement of the at least one first reflector element is shifted.

3. The laser projection device as recited in claim 1, wherein the at least one control and/or regulating unit is configured to control and/or regulate the at least one second reflector element in such a manner, that the starting point of the movement of the at least one second reflector element in consecutive, single images is shifted.

4. The laser projection device as recited in claim 1, wherein the at least one control and/or regulating unit is configured to control and/or regulate an image reconstruction synchronously to a movement of the at least one first reflector element and the at least one second reflector element as a function of a shift in the starting point of the movement of the at least one first reflector element in at least two consecutive, single images.

5. The laser projection device as recited in claim 1, wherein the at least one control and/or regulating unit is configured to control and/or regulate a degree of overlap of lines of at least two consecutive, single images, using a vertical offset of at least two trajectories of the laser beam between the at least two consecutive, single images.

6. A laser projection device, comprising:
- at least one first reflector element which is linearly movable, at least in sections, a period of the at least one first reflector element corresponding to a period of time for reproducing a single image;
- at least one second reflector element which is movable in a sinusoidal manner, the at least one first reflector element and the at least one second reflector element being movable about two axes which are at least substantially perpendicular to each other; and
- at least one control and/or regulating unit configured to control and/or regulate the at least one first reflector element in such a manner, that in at least two consecutive, single images, a starting point of a movement of the at least one first reflector element is shifted,
- wherein the at least one control and/or regulating unit is configured to increment a vertical y-coordinate of each pixel in a single image by a value corresponding to the shift in the starting point of the movement of the at least one first reflector element,
- wherein the at least one control and/or regulating unit) is configured to ascertain the y-coordinate of an nth pixel, $y_n$, as follows:

$$y_n = \underset{n_i}{\Sigma \Delta y} + \text{int}\left(\frac{n}{n_y}\right) \cdot o_{line} + (m-1) \cdot o_{frame},$$

$$\text{where } n_i = n - \text{int}\left(\frac{n}{n_y}\right) \cdot n_y,$$

where n is a number of a pixel inside of a single image, ni is a number of a pixel within a line, $\Delta y$ corresponds to an increment of a vertical position of a pixel for a time interval, in which the pixel is projected, as a result of a continuous movement of the first reflector element, $n_y$ is a number of pixels in one line, $O_{line}$ is a vertical offset at an end of a line in a single image, m is a number of a single image, where m=1...$m_i$, $m_i$ is an interleaving factor, and $O_{frame}$ is a vertical offset of at least two trajectories of the laser beam between at least two consecutive, single images.

7. A method for operating a laser projection device, the laser projection device including at least one first reflector element, which is linearly movable, at least in sections, a period of the at least one first reflector element corresponding to a period of time for reproducing a single image, and including at least one second reflector element, which is movable in a sinusoidal manner, the at least one first reflector element and the at least one second reflector element being movable about two axes at least substantially perpendicular to each other, the method comprising:
- controlling and/or regulating the at least one first reflector element in such a manner, that in at least two consecutive, single images, a starting point of a movement of the at least one first reflector element is shifted,
- wherein the at least one control and/or regulating unit is configured to increment a vertical y-coordinate of each pixel in a single image by a value corresponding to the shift in the starting point of the movement of the at least one first reflector element.

8. The method as recited in claim 7, further comprising:
- controlling and/or regulating an image reconstruction synchronously to a movement of the at least one first reflector element and the at least one second reflector element, as a function of a shift in the starting point of the movement of the at least one first reflector element in at least two consecutive, single images.

9. A laser projector having at least one laser projection device, the laser projection device including at least one first reflector element, which is linearly movable, at least in sections, a period of the at least one first reflector element corresponding to a period of time for reproducing a single image, and including at least one second reflector element, which is movable in a sinusoidal manner, wherein the at least one first reflector element and the at least one second reflector element are movable about two axes which are at least substantially perpendicular to each other, and at least one control and/or regulating unit configured to control and/or regulate the at least one first reflector element in such a manner, that in at least two consecutive, single images, a starting point of a movement of the at least one first reflector element is shifted,
- wherein the at least one control and/or regulating unit is configured to increment a vertical y-coordinate of each pixel in a single image by a value corresponding to the shift in the starting point of the movement of the at least one first reflector element.

* * * * *